United States Patent [19]
Machida

[11] 3,992,719
[45] Nov. 16, 1976

[54] VIDEO SIGNAL RECORDING/REPRODUCING APPARATUS WHEREIN THE PHASE OF THE RECORDED SIGNAL IS SYNCHRONIZED WITH THE SCANNING HEAD

[75] Inventor: Yukihiko Machida, Mitaka, Japan
[73] Assignee: Sony Corporation, Tokyo, Japan
[22] Filed: Apr. 7, 1975
[21] Appl. No.: 565,582

[30] Foreign Application Priority Data
Apr. 9, 1974  Japan.............................. 49-40226

[52] U.S. Cl..................................... 360/37; 360/70
[51] Int. Cl.².......................................... H04N 5/795
[58] Field of Search ................... 360/33, 37, 36, 70

[56] References Cited
UNITED STATES PATENTS

| | | | |
|---|---|---|---|
| 3,647,953 | 3/1972 | Booker | 360/33 |
| 3,798,357 | 3/1974 | Narahara | 360/33 |
| 3,821,803 | 6/1974 | Sakamoto | 360/33 |
| 3,869,709 | 3/1975 | Yamagishi | 360/33 |
| 3,905,043 | 9/1975 | Frank | 360/70 |
| 3,911,483 | 10/1975 | Kihara | 360/33 |

*Primary Examiner*—Jay P. Lucas
*Attorney, Agent, or Firm*—Lewis H. Eslinger; Alvin Sinderbrand

[57] ABSTRACT

Video signals are recorded in successive record tracks on a record medium without guard bands or spaces between adjacent tracks, thereby enhancing the utilization of the record medium. Interference between the signals recorded in adjacent tracks is avoided during reproduction thereof by recording such video signals in adjacent tracks with their respective synchronizing signals aligned in the direction substantially at right angles to the length of the tracks and with carrier components of the signals recorded in the adjacent tracks being of the same frequency and having the same phase relation to the effective scanning direction during recording. During reproduction of the signals thus recorded, non-interfering signals recorded in two or more adjacent tracks are simultaneously reproduced by a reproducing magnetic head without the necessity of a servo tracking arrangement to align the scanning paths of the magnetic reproducing head relative to the record tracks.

11 Claims, 6 Drawing Figures

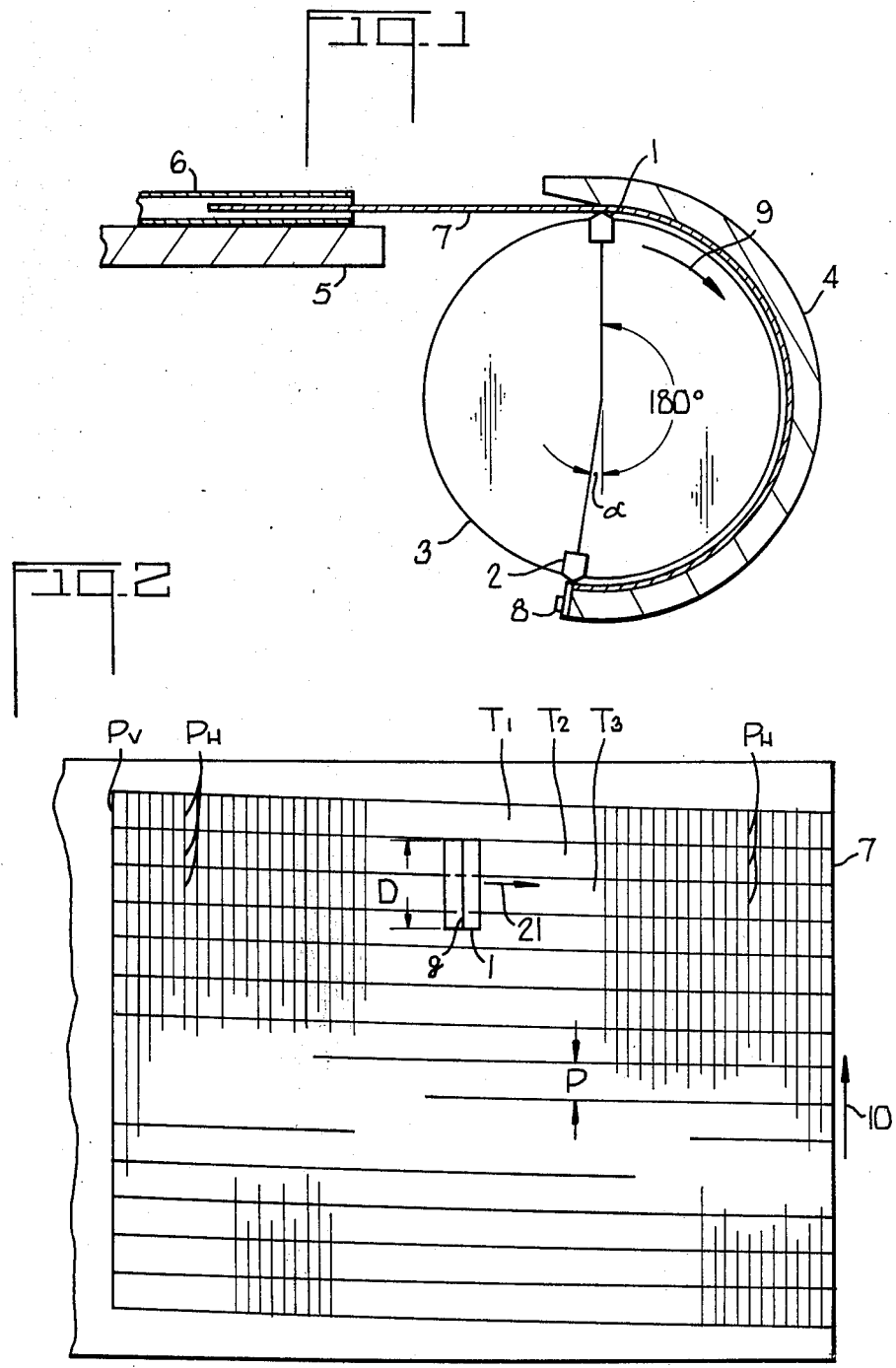

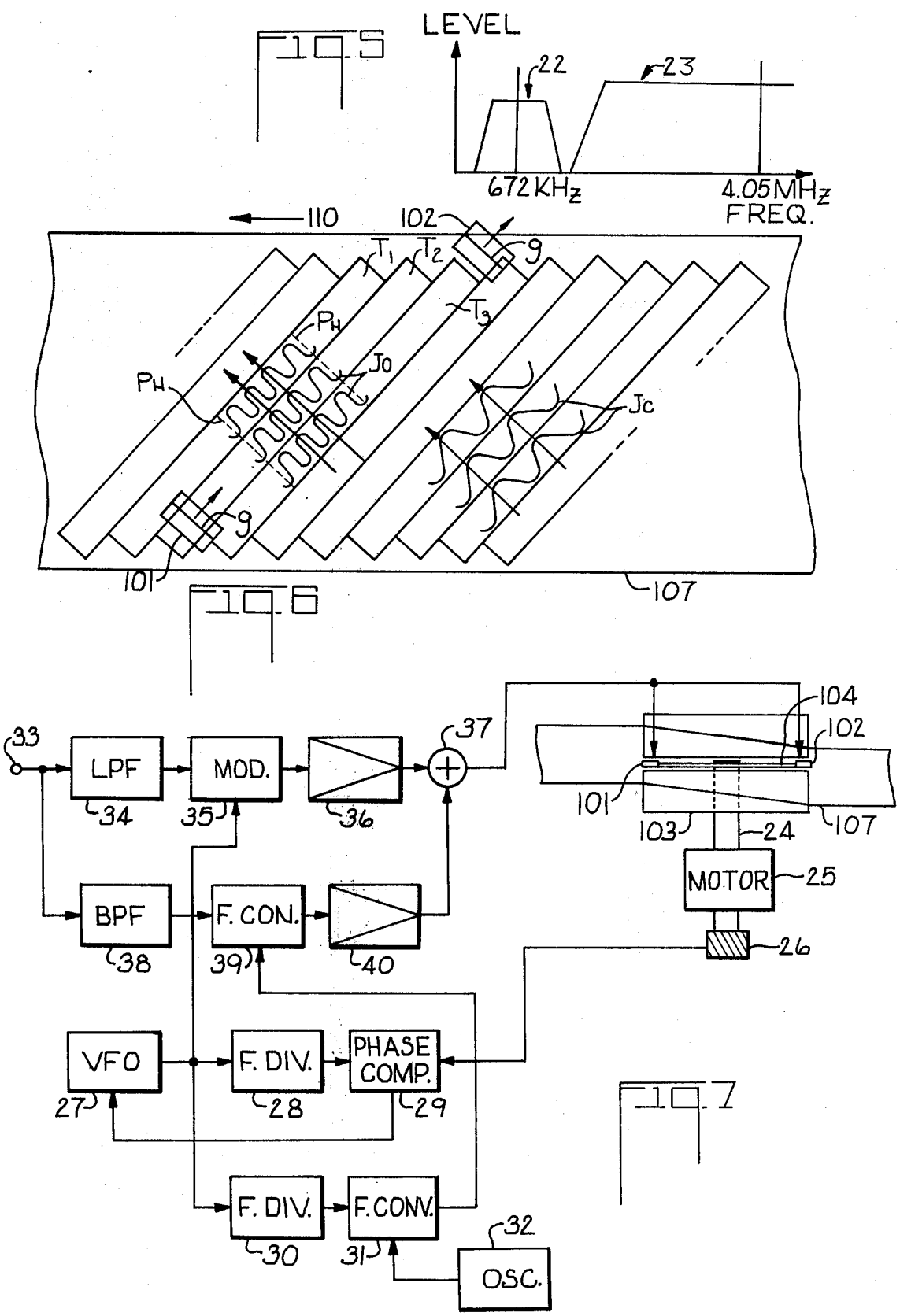

VIDEO SIGNAL RECORDING/REPRODUCING APPARATUS WHEREIN THE PHASE OF THE RECORDED SIGNAL IS SYNCHRONIZED WITH THE SCANNING HEAD

BACKGROUND OF THE INVENTION

1. Field of the Invention

This invention relates generally to the recording and reproducing of a visual image or video signals, and more particularly is directed to the recording and reproducing apparatus in which a visual image or video signals are recorded in successive record tracks on a record medium without guard bands between adjacent tracks.

2. Description of the Prior Art

In existing systems for recording visual image signals or video signals on a magnetic record medium, such as, a magnetic tape and reproducing such signals, successive fields or frames of the video signal are recorded along respective record tracks which extend obliquely across the tape, with guard bands or spaces being provided between the successive record tracks on the record medium so that, when the recorded video signal is being reproduced by a magnetic reproducing head or heads scanning the tracks in succession, the signal being reproduced during the scanning of one of the tracks will not be deteriorated by cross-talk from the signal recorded in the next adjacent tracks. The width of each of the guard bands, or unrecorded spaces, between adjacent tracks is usually selected to be from 60 to 100% of the width of the record tracks with the result that from 30 to 50% of the area of the record medium is wasted, that is, is not occupied by recorded signals. Thus, even in the case of recording video signals on the magnetic tape, a relatively large length of the magnetic tape is required for the recording of each unit period of time of the video signal and, by reason of the inherent limitation of the length of the tape that may be wound on a single reel, the video signal cannot be recorded for a long period of time without interruption. Even more severe limitations are imposed on the length of time during which a video signal can be recorded without interruption when the record medium is in the form of a disc of magnetic sheet material having a spiral record track with the guard bands being provided between adjacent turns of the spiral track, or when the medium is in the form of rectangular sheet of magnetic material having a series of record tracks extending generally parallel to its major axis with guard bands between such tracks, or when the medium is in the form of a very narrow magnetic tape, for example, less than ¼ inch, with having a series of record tracks extending obliquely across the tape without guard bands between such tracks.

Further, in the existing systems, as described above, it is customary to provide a servo tracking arrangement by which each reproducing head is made to scan accurately along a record track so that the previously mentioned guard bands can protect against the simultaneous reproduction of signals recorded in two adjacent tracks which would cause interference, for example, in the form of a beat signal.

SUMMARY OF THE INVENTION

Accordingly, an object of this invention is to provide an improved system for recording a video signal on a record medium and reproducing a previously recorded signal while avoiding the above-mentioned disadvantages of existing systems.

Another object of this invention is to provide a system for recording a video signal on a record medium, and reproducing a previously recorded signal, wherein the utilization efficiency of the reocrd medium is increased without resultant interference between the signals recorded in and reproduced from adjacent record tracks.

Still another object of this invention is to provide a system for magnetic recording a video signal on a magnetic record medium, and reproducing a previously recorded signal, wherein the video signal recorded on the magnetic record medium is reproduced without requiring a servo tracking arrangement to align the scanning paths of the magnetic reproducing head relative to the record tracks.

A further object of this invention is to provide a system for magnetic recording a video signal on a magnetic record medium, and reproducing a previously recorded signal, wherein the successive record tracks have no guard bands therebetween, and may even overlap, thereby enhancing the utilization of the record medium while avoiding, during reproduction, any interference between signals recorded in the adjacent tracks.

A still further object of this invention is to provide a system for magnetic recording and reproducing of a video signal on a magnetic record medium, as aforesaid, and in which the recorded signal is reproduced with high resolution and high signal-to-noise (S/N) ratio.

In accordance with one aspect of this invention, video signals are recorded in successive record tracks on a record medium, such as sheet or tape, without guard bands or spaces between the successive tracks so as to utilize fully the area of the record sheet for recording video signals, and the video signals recorded in adjacent tracks have their respective synchronizing signals aligned in the direction at right angles to the length of the tracks and further have carrier components of the same frequency and of the same phase relation to the effective scanning direction during recording so that, during reproduction of the recorded video signals, interference will not exist between signals that may be reproduced from adjacent tracks. During reproduction the recorded tracks are preferably scanned along an area of substantially greater width than the pitch of the record tracks so as to ensure the reproduction of the successively recorded signals without the need for providing a servo tracking arrangement. In thus reproducing the recorded signals, signals are simultaneously reproduced from at least two adjacent tracks without interference between the reproduced signals so as to provide high resolution and S/N ratio.

The above, and other objects, features and advantages of this invention, will be apparent in the following detailed description of illustrative embodiments which is to be read in connection with the accompanying drawings.

BRIEF DESCRIPTION OF THE DRAWINGS

FIG. 1 is a cross-sectional view of a rotary head assembly that may be used according to this invention.

FIG. 2 is a plan view of one embodiment of a magnetic record sheet having plural record tracks thereon and also showing the relationship between the tracks and a signal reproducing head used in accordance with this invention.

FIG. 5 is an approximate frequency spectrum of a luminance signal and a chrominance signal to be recorded on the record medium.

FIG. 6 is an enlarged diagram of another embodiment of a magnetic record tape on which the signal carrier arrangement between adjacent tracks is explained.

FIG. 7 is a schematic block diagram of a circuit for correlating the carrier of video signal and the magnetic record medium in accordance with the invention.

DESCRIPTION OF THE PREFERRED EMBODIMENT

Figure 3:
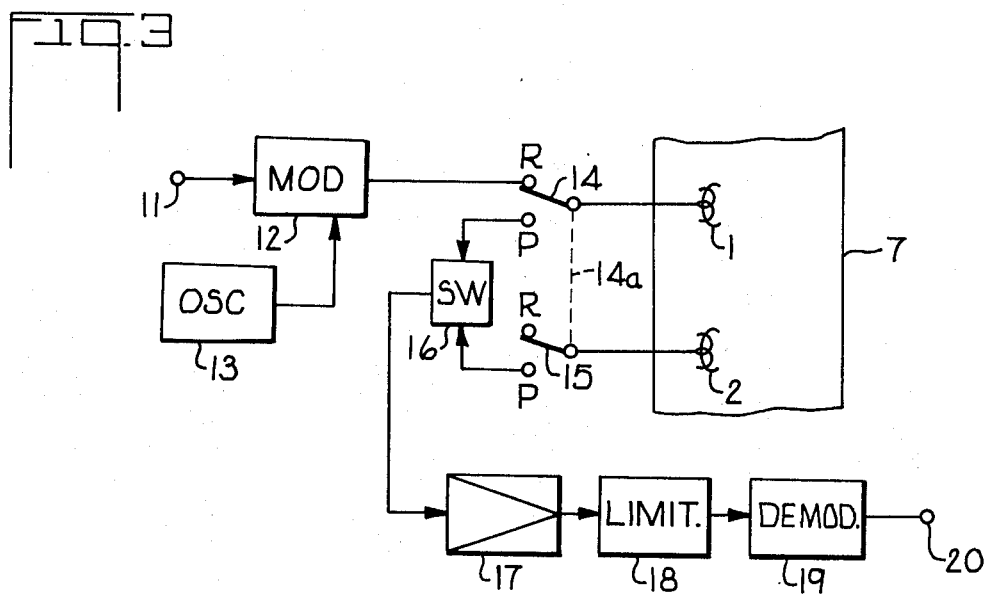
FIG. 3 is a schematic block diagram of a circuit for video recording and reproducing according to this invention.

In FIG. 1, a pair of rotary magnetic heads 1 and 2 are shown mounted on the perimeter of a sheet guide drum 3 mounted on rotary shaft (not shown). The angular distance from the head 1 to the head 2 is greater than 180° by a small angle $\alpha$ as measured in the direction of rotation of the shaft, drum and heads. In addition, the heads 1 and 2 are mounted at positions on the same axial level, or position, of the common rotary shaft.

A semi-cylindrical sheet guide member 4 extends approximately half way around the sheet guide drum 3 and is separated from the perimeter of the drum by a small gap. A table 5 is located beside the guide drum 3, and an envelope 6 is disposed thereon. A rectangular magnetic sheet 7 stored in the envelope is shown partly drawn out of the envelope and fed between the drum 3 and the guide member 4 to be wound around the guide drum 3 over an angular range of 180° + $\alpha$. One end of the magnetic sheet 7 is forced against a stop 8 attached to the guide member 4.

With such an arrangement, the heads 1 and 2 are rotated together with the drum 3 in a direction indicated by an arrow 9 at a speed of one revolution per frame, and the table 5 and sheet 7 are moved in the axial direction of the rotary shaft of the heads 1 and 2, as shown by an arrow 10 in FIG. 2, continuously at a constant speed.

If one horizontal period is designated as H and the value of $n$ is set at $n = 0, 1, 2$, the aforementioned angle is related to $(n = \frac{1}{2})$H as follows:

$$\alpha = 360° \times \frac{n + 1/2}{525}$$

In this case, the value of $n$ may be selected as zero, as an example.

The moving speed of the sheet 7 in the axial direction is selected so that, during one revolution of the heads 1 and 2 or one frame interval, the sheet 7 is moved by a distance P (2) which is smaller than the width D of the air gap $g$ of the heads 1 and 2.

With the above condition, a video signal is supplied to one head, for example, the head 1 to record it on the sheet 7. In this case, the rotational phase of the heads 1 and 2 is synchronized with, for example, a video signal to be recorded so that the head 1 first makes contact with the sheet 7 as shown in FIG. 1 simultaneously with the start of an odd-numbered field of the video signal to be recorded. Thus, the head 1 records on the sheet 7 the odd-numbered field of each frame, or more specifically, a portion of the first horizontal interval of each frame to the 263rd horizontal interval in succession when the value of $n$ is selected as zero. In this case, the respective tracks are successively formed in what is called an overlapped condition, so that the width of each of the effective residual tracks $T_1$, $T_2$, $T_3$, is equal to P, which is smaller than the width D of the gap $g$ of the head 1, and no guard band is formed between adjacent tracks. Recording positions $P_V$ of the vertical synchronizing signals are aligned at one position on the sheet 7, and recording positions $P_H$ of the horizontal synchronizing signals are aligned along the moving direction of the sheet 7.

On reproducing the recorded signals, the heads 1 and 2 are similarly rotated, as mentioned above, and the sheet 7 is moved in the axial direction of the rotary shaft of the heads 1 and 2 at the above-described speed to scan each track alternately. In this case, since the width of each of the tracks $T_1$, $T_2$, $T_3$, is smaller than the width D of the air gap $g$ of each of the heads 1 and 2, the heads 1 and 2 will scan over two adjacent tracks or more.

In general, during recording, a video signal is recorded after being, for example, phase-modulated. The recorded signal is demodulated during reproduction.

As depicted in FIG. 3, a video signal from an input terminal 11 is applied to a phase modulator 12 to phase-modulate a carrier signal from an oscillator 13 and the resultant modulated video signal is fed through a recording contact R of one arm 14 of a double-pole, double-throw recording and reproducing change-over switch 14a to the head 1 to record it on the sheet 7 as described above. During reproduction, or playback, signals reproduced alternately by the heads 1 and 2 are applied respectively through reproducing contacts P of the recording and reproducing change-over switches 14 and 15 to a switching circuit 16. Each output signal therefrom is supplied through a reproducing amplifier 17 and a limiter 18 to a demodulator 19 to obtain a demodulated signal at an output terminal 20.

Figure 4:
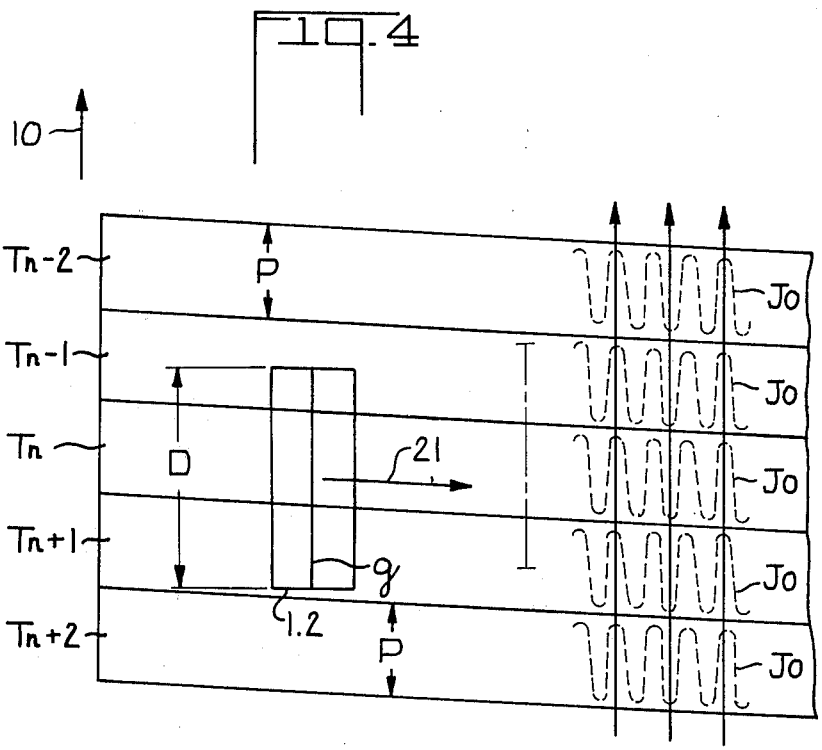
FIG. 4 is an enlarged plan view showing the positional relationship between adjacent tracks and the signal reproducing head and the signal carrier to be recorded in such adjacent tracks on the recording sheet in FIG. 2.

In this case, during recording, as shown in FIG. 4 by broken lines, the phases of carrier signals $J_0$ to be modulated are caused to be aligned at each position in a direction substantially at right angles to the moving direction of the sheet 7 at respective tracks $T_{n-1}$, $T_n$, $T_{n+1}$, and the modulation index $m$ in phase modulation is selected to be small. For example, an index $m$ of less than 2.405 has been found to be satisfactory according to experiment.

With the above arrangement, during reproduction, even if the heads 1 and 2 that scan the sheet 7 spread over two or more adjacent tracks, for example, over the three tracks $T_{n-1}$, $T_n$, and $T_{n+1}$ in the direction indicated by an arrow 21 in FIG. 4, the reproduced video signal obtained at the output terminal 20 is equal to a composite signal of the original, or unmodulated, video signals corresponding to information recorded on the respective tracks at a predetermined level ratio in accordance with the positions of the gaps $g$ of the heads 1 and 2, and consequently any beat interference or the like is not produced. The reason for producing no beat interference mentioned above is fully described in the same Assignee's co-pending U.S. application Ser. No.

425,845, filed on Dec. 18, 1973, now U.S. Pat. No. 3,911,483, issued Oct. 7, 1975.

The above-described example is of the case wherein the video signal is recorded after being phase-modulated. However, according to the accuracy of recent motor drive systems for magnetic sheets and head drums, the accuracy of the magnetic head itself, and the improvement in the quality of the magnetic record medium, the video signal may be recorded after being amplitude-modulated instead of being phase-modulated. It has been noticed that the influence of a so-called amplitude-modulated (AM) noise is small and the deterioration of the S/N ratio is less.

Next, a description will be given of an example of the recording of a color signal on a sheet.

When a composite color video signal is being recorded, the luminance signal component is recorded after being phase-modulated as described above. On the other hand, the chrominance signal component, which includes a chrominance subcarrier amplitude-modulated by chrominance signals, such as a red color difference signal (R-Y) and a blue color difference signal (B-Y), is first frequency-converted to a lower frequency band. After being frequency-converted, it is added to the phase-modulated luminance signal to be recorded on the record medium. The frequency-converted chrominance subcarrier in adjacent record tracks are aligned in the same phase relative to the effective scanning direction of the recording head, as has been previously described in respect to the carrier of the phase-modulated signal. FIG. 5 shows the frequency spectrum distribution of a phase or amplitude-modulated luminance signal 23 and a chrominance signal 22 converted into a lower frequency band.

FIG. 6 shows a recording pattern on a tape 107 used in a normal helical-scan type video tape recorded in place of the aforesaid magnetic sheet. The elements corresponding to those in FIG. 4 are indicated by the same reference characters. In FIG. 6, the phases of modulating carriers $J_0$ of the luminance signal on adjacent tracks are arranged in an in-phase relation in a direction substantially at right angle to the scanning direction of a pair of heads 101 and 102. Further, the phases of frequency-converted chrominance subcarriers $J_c$ are similarly arranged in an in-phase relation with each other. An arrow 110 denotes the direction of tape movement.

The present invention provides an apparatus such that when a video signal is recorded as mentioned above, the phases of carriers in the respective tracks are positively aligned at each position in the longitudinal direction of each track. One example of the apparatus of this invention will hereinafter be described with reference to FIG. 7 wherein, for example, a color video signal is recorded.

In FIG. 7, reference numeral 24 represents a rotary shaft of a head drum 104 to which to heads 101 and 102 are mounted. The rotary shaft 24 is rotated by a servo motor 25 at 30Hz in synchronism with a video signal to be recorded. The tape 107 is obliquely wound on a tape guide drum 103 over an angle of approximately 180°. A signal producer, or frequency generator, 26 is provided on the shaft 24 to produce a signal that has a phase corresponding to the rotational phase of the rotary shaft 24. The frequency generator 26 has a large number of teeth, for example, 525 and hence a signal having a frequency of 15.75KHz is derived therefrom. There is also provided a voltage-controlled variable frequency oscillator 27 having a center frequency which is substantially higher than the frequency of a signal derived from the frequency generator 26. The center frequency of the oscillator 27 may be $15.75KHz \times 2^8 = 4.032$, by way of example.

An oscillation signal of the oscillator 27 is fed to a first frequency divider 28 for being divided by $2^8$ to produce a signal having a frequency of 15.75KHz. This signal is supplied to a phase comparator circuit 29 and phase-compared therein with the signal of frequency 15.75KHz having a phase corresponding to the rotational phase of the head 101 derived from the frequency oscillator 26. A resultant error signal is fed to the oscillator 26 to control the oscillator frequency. Accordingly, the signal of frequency 4.032 derived from the oscillator 27 has a phase that corresponds to the rotational phase of the head 101.

The signal of the oscillator 27 is further supplied to a second frequency divider 30 to be divided by 6 to produce a signal having a frequency of approximately 672KHz which is supplied to a frequency converter 31. A reference frequency oscillator 32 produces a signal having a frequency of 3.58MHz which is the frequency of a subcarrier. The latter signal is also applied to the frequency converter 31 to be combined with the 672KHz signal to derive a signal having a frequency of about 4.25MHz. Since the signal derived from the variable frequency oscillator 27 has a phase that corresponds to the rotational phase of the head 101, the signal derived from the frequency converter 31 also has a phase that corresponds to the rotational phase of the head 101.

An input color video signal from a terminal 33 is applied to a low pass filter 34 to derive therefrom a luminance signal which is applied to a modulator, such as a phase modulator 35 to phase-modulate the carrier signal from the variable frequency oscillator 27. As noted, the phase of this carrier signal corresponds to the rotational phase of the head 101. The resulting modulated luminance signal is supplied through a recording amplifier 36 to an adder 37.

The input color video signal is also supplied to a band pass filter 38 to separate out a chrominance signal to be fed to a frequency converter 39. The chrominance signal is frequency-converted into a lower frequency band by the signal from the frequency-converter 31. This signal also has a phase that corresponds to the rotational phase of the head 101. The resulting converted chrominance signal is fed through an amplifier 40 to the adder 37 to be added to the modulated luminance signal. The resulting composite signal is supplied to the head 101 to be recorded on the magnetic tape 107 as described above.

Thus, in the respective tracks on the tape 107, even if there is a phase error based on jitter caused by uneven rotations of the heads 101 and 102, the phase of the carriers of the video signal and those of the subcarriers of the frequency-converted chrominance signal are respectively coincident with one another accurately at each position on the longitudinal direction of each track. Accordingly, during reproduction, the desired reproduced signal as mentioned above can be obtained.

Furthermore, during reproduction, reproduced signals from the heads 101 and 102 are supplied to a high pass filter to derive therefrom a modulated luminance signal which is supplied through a limiter to a demodulator to produce a demodulated luminance signal. The reproduced signal is also supplied to a low pass filter to derive therefrom a chrominance signal converted to a lower frequency band which is then reconverted to the original frequency.

When a rotary magnetic sheet is used, as the record medium, the aforesaid frequency generator may be mounted to the rotary shaft of the rotary magnetic sheet.

In all of the foregoing, the invention has been described as applied to the magnetic recording and reproducing of video signals. However, in place of a magnetic record medium, the record medium may be a thin plastic foil in which grooves are formed with varying depths to constitute the record tracks having video signals recorded therein, with such recorded signals being reproduced by a diamond or other stylus moving along the successive record tracks and associated with a suitable transducer, such as a piezo-electric ceramic transducer or the like, by which the resulting phase produced variations, for example variations in the pressure on the pickup stylus, are converted to a corresponding electric signal. The invention can also be applied to the electro-optical recording and reproducing of video signals, for example, in which the successive record tracks on the record medium have either variations in light reflectivity or transmission corresponding to the recorded signals therein.

The invention can be further applied to a record medium constituted by a vinyl base sheet having a coating of aluminum or copper thereon and a dielectric coating, such as, of polystyrene, on the aluminum or copper coating, in which case the video signals are recorded as variatons in the capacitance along the successive record tracks. When reproducing such signals, the variations in capacitance between the electrode of a pickup head moving along the record tracks in succession and the aluminum or copper coating of the record medium are employed to produce an output signal corresponding to the original recorded video signals.

Although specific embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording video signals, said apparatus comprising:
   A. a record medium;
   B. a rotatable signal recording transducer by which the video signals are recorded on said record medium in successive record tracks which extend substantially parallel to each other;
   C. an input terminal to which the video signals are supplied;
   D. an output terminal from which a modulated video signal is supplied to the signal recording transducer;
   E. a signal modulator connected between said input and output terminals to modulate signals applied to the input terminal and to supply the resulting modulated signals to the output terminal;
   F. a signal generator for producing alternating signals corresponding to the rotational phase of the transducer relative to the record medium;
   G. a variable frequency oscillator connected to the modulator to supply a carrier signal thereto; and
   H. a phase comparator connected to the oscillator and the signal generator for comparing the phase relation between the outputs of said variable frequency oscillator and the signal generator, the output of the comparator being applied to the variable frequency oscillator so that the output phase thereof is controlled by an error signal of the comparator in response to the rotational phase of the transducer relative to the record medium.

2. Apparatus according to claim 1 comprising a head drum, the transducer being mounted on the head drum and the alternating signals being produced in accordance with the rotation of the head drum.

3. Apparatus according to claim 2, wherein the head drum has a shaft and the signal generator is coupled to the shaft.

4. Apparatus according to claim 1 wherein the variable frequency oscillator oscillates at a substantially high frequency rather than that of the signal generator, the apparatus comprising a frequency divider connected to the oscillator to divide the output thereof to produce the same frequency as the nominal frequency of the signal generator to be compared therewith.

5. Apparatus according to claim 1 wherein the modulator is a phase-modulator, the modulation index of which is less than 2.405.

6. Apparatus according to claim 1 wherein the modulator is an amplitude-modulator.

7. Apparatus according to claim 1 wherein the record medium is magnetically sensitive, and the signal recording transducer is a magnetic head.

8. Apparatus according to claim 1 further comprising: a frequency converter located between the input and output terminals by which a color signal component of the video signal is frequency-converted into a lower-frequency band and the output of the variable frequency oscillator is fed to the converter for frequency conversion of the color signal so that the output phase of frequency converter is controlled in response to the rotational phase of the transducer relative to the record medium.

9. Apparatus according to claim 8 comprising a mixer connected to the output of the modulator and the output of the frequency converter to mix their output signals together to be fed to the signal recording transducer.

10. Apparatus for recording and reproducing video signals employing the apparatus claimed in claim 1 wherein the signal transducer is used as a signal-recording transducer and as a signal-reproducing transducer.

11. Apparatus for recording color video signals, said apparatus comprising:
   A. a record medium;
   B. a rotatable signal recording transducer by which the color video signals are recorded on said record medium in successive record tracks which extend parallel to each other;
   C. an input terminal to which the color video signal is supplied;
   D. an output terminal from which a frequency converted color signal is supplied to the signal recording transducer;
   E. a frequency converter by which the color video signal is converted to a lower-frequency band;
   F. a frequency generator for producing alternate signals corresponding to the rotational phase of said transducer relative to the record medium; and
   G. a variable frequency oscillator for feeding a carrier signal for frequency conversion to the frequency converter so that the output phase of frequency converter is controlled in response to the rotational phase of the transducer relative to the record medium.

* * * * *